3,309,895
ABSORPTION TYPE REFRIGERATOR
Kazumi Tamada, Niwa-gun, Japan, assignor to Howa Sangyo Kabushiki Kaisha Nagoya-shi, Japan, a Japanese joint-stock company
Filed Jan. 28, 1966, Ser. No. 523,794
Claims priority, application Japan, July 1, 1965, 40/38,973
1 Claim. (Cl. 62—475)

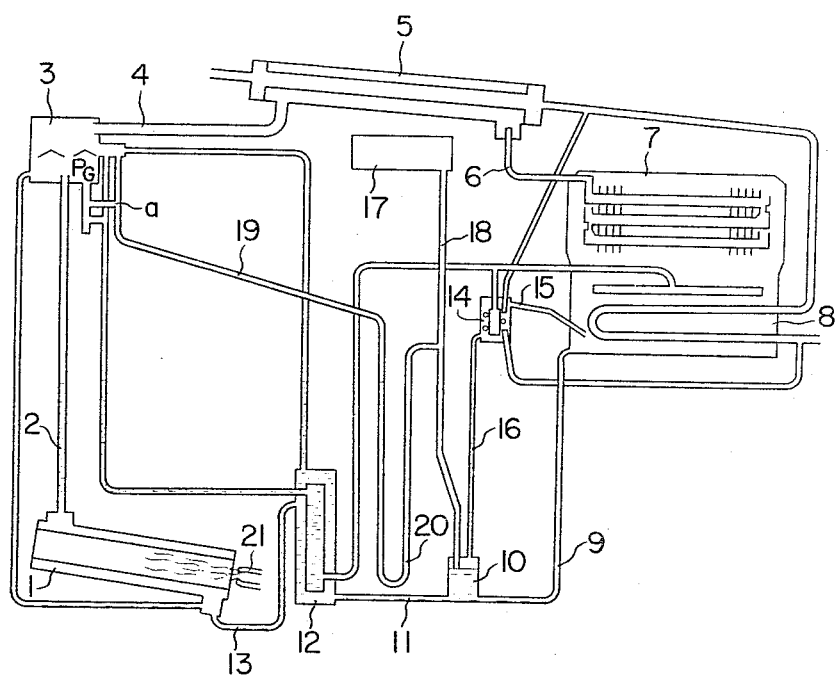

This invention relates to absorption type refrigerating apparatuses and more particularly to a new refrigerator of the absorption type wherein water is used as a refrigerant, the refrigerator being characterized in that internal non-condensable gas detrimental to cooling operation is removed and stored in a separate chamber.

In a conventional refrigerator of the instant type wherein a lithium bromide solution is used as an absorbent, and water is used as a refrigerant, the sealed-in aqueous solution of lithium bromide is heated in a generator from the outside, and the water constituting the refrigerant is separated away by evaporation from this aqueous solution and, passing through a condenser, reaches an evaporator, where the water undergoes vacuum evaporation and thereby accomplishes cooling.

The refrigerant which has evaporated in the evaporator to become water vapor is absorbed in an absorber by a concentrated lithium bromide solution, whereby the evaporator is maintained at a specified low pressure, and, at the same time, the absorbent solution is again sent to the generator.

While the cooling action is accomplished by repetition of the above described circulation, for effective cooling action, of course, it is necessary that no gas other than water vapor be present in the interior of the refrigeration system. That is, the presence of even a minute quantity of a non-condensable gas causes a lowering of the absorptive capacity of absorbent solution, whereby the evaporator pressure rises, and the desired evaporation cannot be carried out.

The non-condensable gas, as is well known, may consist of one or more of various gases as, for example, air infiltrating from the outside into the system interior or hydrogen gas generated by corrosion in the piping system. Heretofore, various devices for eliminating this non-condensable gas have been proposed, but in these devices water vapor is also separated out together with the non-condensable gas, and it has been difficult to separate and remove only the non-condensable gas.

It is an object of the present invention to overcome the above described difficulty.

Briefly stated, the present invention provides, in a refrigerator of the absorption type comprising a generator, a gas-liquid separator, a condenser, an evaporator, an absorber, a separation pot, and a heat exchanger, all constituting an enclosed, sealed-in system, means for preventing non-condensable gas existing within said system from adversely affecting the cooling efficiency of the system, said means comprising a purge pump communicatively connected between the absorber and the separation pot, a gas separator pipe, a non-condensable gas storage chamber communicatively connected through the gas separator pipe to the upper part of the separation pot, and a U-shaped tube through which the gas-liquid separator is communicatively connected to an intermediate part of the separator pipe.

The nature, principle, and details of the invention will be more clearly apparent from the following detailed description with respect to a preferred embodiment of the invention when read in conjunction with the accompanying drawing in which the single figure is a schematic diagram showing the essential composition and piping arrangement of an absorption type refrigeration system embodying the invention.

Referring to the drawing, energy is supplied from the outside in the form of heat through a burner 21 for heating a generator 1, which is connected at its outlet end by way of a pipe 2 to the bottom of a gas-liquid separator 3. The upper part of the separator 3 is connected by way of a pipe 4 to the inlet of a condenser 5, the outlet of which is connected by way of a pipe 6 to an evaporator 7, below which there is provided an absorber 8.

The absorber 8 is connected at its bottom by way of a pipe 9 to the bottom part of a separation pot 10, which bottom part is connected through a pipe 11 to the bottom end of one flow path of a heat exchanger 12, the upper end of the flow path being connected by way of a pipe 13 to the inlet of the generator 1.

A purge pump 14 connected through a pipe 15 to the lower part of the absorber 8 is provided and is connected at its lower part through a thin gas-liquid descent pipe 16 to the upper part of the separation pot 10, which upper part is connected also by way of a gas separation pipe 18 to a storage chamber 17 for non-condensable gas. The pipe 18 is connected at approximately its midpoint to one end of a U-shaped tube 20, the other end of which is connected by way of a pipe 19 to the lower part of the gas-liquid separator 3.

The operation of the refrigeration system according to the invention as described above will be described in a simple manner with respect to the refrigeration operation. From the generator, a heated aqueous solution of lithium bromide passes out through the pipe 2 and reaches the gas-liquid separator 3, and water, serving as the refrigerant, flows through the pipe 4, condenser 5, and pipe 6 to the evaporator 7. The water undergoes vacuum evaporation in the evaporator 7, thereby accomplishing the desired cooling, and then is absorbed by a lithium bromide solution in the absorber 8. Thereafter, the water thus absorbed passes through the pipe 9, the separation pot 10, pipe 11, heat exchanger 12, and pipe 13 and returns to the generator 1. The above described operation cycle is repeated continuously.

During this operation, non-condensable gas, as mentioned hereinbefore, is present together with the absorbent liquid and water vapor in the bottom part of the absorber 8, but this mixture is caused by the operation of the purge pump 14 to flow through the pipe 15 and through the gas-liquid descent tube 16 and is introduced into the separation pot 10. Detailed description of this operation is herein omitted since it is well known and is not necessary for an understanding of the present invention.

In the separation pot 10, the non-condensable gas accumulates at the upper part thereof, and a mixture of the absorbent liquid and water vapor collects at the bottom part thereof. Then, as the pressure of the non-condensable gas rises, the liquid level within the separation pot 10 drops below the lower end of the pipe 18, whereupon the non-condensable gas rises through the pipe 18 and accumulates in the storage chamber 17.

During this operation, since the non-condensable gas is in constant contact with the water vapor, it is introduced together with water into the storage chamber 17. However, because of effects such as temperature change and contact with the chamber walls, almost all of this water vapor condenses and descends in reverse direction through the pipe 18. Moreover, since this water has a lower density than the original solution existing therein, it does not mix therewith but remains unchanged, forming a layer of water above the solution.

Then, as the quantity of gas stored in the storage chamber 17 increases, the thickness of the above mentioned water layer also increases, and as a result the water vapor partial pressure, which is much higher than the solution vapor pressure, clearly increases.

When this state is caused, the gas storing capability of an apparatus of this type fundamentally can be considered to correspond to the total gas pressure (strictly speaking, the difference at the time resulting from subtracting the solution vapor pressure from the hydrostatic pressure of the solution column blocking the gas) corresponding to said hydrostatic pressure. Accordingly, the actual quantity which can be stored of the non-condensable gas which is aimed at in the apparatus becomes an unfavorable quantity resulting from the subtraction of the coexisting water vapor partial pressure (which, in general, is approximately 60 percent of the total gas pressure which can be stored).

The great decrease in the capability for storing non-condensable gas cannot be avoided with the apparatus arrangement and composition as described above. By the practice of the present invention, however, the strong solution of lithium bromide separated out by the aforementioned gas-liquid separator 3 flows through the pipe 19 and U-tube 20 and enters as drops into the pipe 18, and, since this strong solution readily mixes with the above mentioned condensed water, it is possible through suitable regulation of the rate of introduction of said drops to cause all of the liquid column within the pipe 18 to be maintained at a concentration equal to that of the original solution existing therein.

Thus, the water vapor which has once reached the storage chamber 17 condenses and, mixing with the strong solution introduced through a separate pipe system and becoming a normal weak solution, is contained within the weak solution pipe system. Accordingly, the problem of the existence of the water vapor reducing the capability of the storage chamber for storing the non-condensable gas is overcome, an effective cooling effect is maintained very much longer than in the case of a conventional refrigerator of like type.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claim.

What I claim is:

In an absorption type refrigerator having a generator, a gas-liquid separator, a condenser, an evaporator, an absorber, a separation pot, and a heat exchanger, all constituting an enclosed, sealed-in system, means for preventing non-condensable gas existing within said system from adversely affecting the cooling efficiency of the system, said means comprising a purge pump communicatively connected between the absorber and the separation pot, a gas separator pipe, a non-condensable gas storage chamber communicatively connected through the gas separator pipe to the upper part of the separation pot, and a U-shaped tube through which the gas-liquid separator is communicatively connected to an intermediate part of the separator pipe.

References Cited by the Examiner

UNITED STATES PATENTS

| | | | |
|---|---|---|---|
| 2,384,860 | 9/1945 | Thomas | 62—475 |
| 2,384,861 | 9/1945 | Roswell | 62—475 |
| 2,473,385 | 6/1949 | Whitlow | 62—475 |
| 2,584,250 | 2/1952 | Berry | 62—475 |
| 2,610,482 | 9/1952 | Berry | 62—475 |

LLOYD L. KING, *Primary Examiner.*